United States Patent [19]
Nagle et al.

[11] Patent Number: 5,954,883
[45] Date of Patent: Sep. 21, 1999

[54] WAXY MAIZE STARCH DERIVED FROM GRAIN OF A PLANT WHICH IS HETEROZYGOUS FOR THE SUGARY-2 ALLELE

[75] Inventors: Barry J. Nagle, Forsyth, Ill.; Joseph L. Emling, Three Bridges, N.J.; William R. Mason, Somerville, N.J.; Roger Jeffcoat, Bridgewater, N.J.

[73] Assignee: National Starch and Chemical Investment Holding Corporation, Wilmington, Del.

[21] Appl. No.: 08/727,690

[22] Filed: Oct. 8, 1996

[51] Int. Cl.[6] .......................... C13K 30/00; C08B 30/00; A01H 1/04
[52] U.S. Cl. ............................ 127/36; 127/32; 127/65; 127/67; 127/71; 800/230; 800/235; 800/250; 800/DIG. 56
[58] Field of Search .................. 127/32, 65, 67, 127/71, 36; 800/230, 235, 250, DIG. 56, 320.1, 263, 284

[56] References Cited

U.S. PATENT DOCUMENTS

| | | | |
|---|---|---|---|
| 3,525,672 | 8/1970 | Wurzburg et al. | 195/31 |
| 3,617,383 | 11/1971 | Thurston et al. | 127/32 |
| 3,949,104 | 4/1976 | Cheng et al. | 127/33 |
| 3,973,985 | 8/1976 | Voigt et al. | 127/33 |
| 4,368,212 | 1/1983 | Heckman | 127/71 |
| 4,428,972 | 1/1984 | Wurzburg et al. | 426/578 |
| 4,510,166 | 4/1985 | Lenchin et al. | 127/71 |
| 4,615,888 | 10/1986 | Zallie et al. | 426/21 |
| 4,770,710 | 9/1988 | Friedman et al. | 127/29 |
| 4,792,458 | 12/1988 | Friedman et al. | 426/578 |
| 4,957,563 | 9/1990 | Gallaher et al. | 127/71 |
| 5,281,432 | 1/1994 | Zallie et al. | 127/71 |
| 5,331,108 | 7/1994 | Nelson et al. | 800/235 |
| 5,356,655 | 10/1994 | White et al. | 426/578 |
| 5,476,674 | 12/1995 | Friedman et al. | 426/552 |
| 5,675,064 | 10/1997 | Pearlstein et al. | 800/200 |

FOREIGN PATENT DOCUMENTS

| | | | |
|---|---|---|---|
| 0 574 721 A1 | 12/1993 | European Pat. Off. | A23L 1/09 |
| WO 95/26642 | 10/1995 | WIPO | A23L 1/0522 |
| WO 95/35027 | 12/1995 | WIPO | A01H 5/10 |

OTHER PUBLICATIONS

N. Inouchi et al., DSC Characteristics of Gelatinization of Starches of Single–, Double–, and Triple–Mutants and . . . , Journal paper No. 12772, Starch/Starke 43 Nr. 12, S. 468–472, 1991 Nov. 1990.

Yasuhito Takeda and Jack Preiss, "Structures of B90 (sugary) and W64A (normal) maize starches" *Carbohydrate Research*, 240 (1993) 265–275, Elsevier Science Publishers B.V., Amsterdam May/Aug. 1992.

M. R. Campbell et al., "Dosage Effect at the Sugary–2 Locus on Maize Starch Structure and Function", Cereal Chemistry, 71(5):464–468, 1994 Dec. 1993/May 1994.

*Primary Examiner*—Mark L. Bell
*Assistant Examiner*—Patricia L. Hailey
*Attorney, Agent, or Firm*—Karen G. Kaiser

[57] ABSTRACT

The present invention is directed to a waxy maize starch derived from a single plant which is heterozygous for the recessive sugary-2 allele. Such starch has excellent low temperature and freeze-thaw stability, a relatively high peak viscosity, a relatively high pasting temperature, and intact granules. The starch is useful in a wide variety of food, pharmaceutical, and industrial applications.

7 Claims, 3 Drawing Sheets

WAXY MAIZE STARCH DERIVED FROM GRAIN OF A PLANT WHICH IS HETEROZYGOUS FOR THE SUGARY-2 ALLELE

BACKGROUND OF THE INVENTION

The present invention relates to a waxy maize starch derived from a plant which is heterozygous for the recessive sugary-2 (su$_2$) allele. Such starch exhibits good freeze-thaw stability, relatively high viscosity, and high pasting temperature, yet is readily recoverable with good yields by wet milling and has a starch content and structure comparable to that of waxy maize.

Starch, in general, contains two types of polymers, amylose which is essentially linear and amylopectin which is branched. Waxy maize starch contains a significantly higher level of amylopectin than common corn starch and is therefore of particular value in applications where the starch serves primarily as a thickener or stabilizer, and where a stable sol which resists retrogradation is desired.

To meet the demanding needs of the food industry, native waxy maize starch is often modified by numerous techniques known in the industry to change the behavioral characteristics yet still essentially retain the caloric value of the unmodified waxy maize starch. In particular, modifications are often made to increase process tolerance and stability in an aqueous dispersion.

One common type of modification is cross-linking. When an aqueous dispersion of native waxy maize starch is heated, the starch granules begin to swell, and the dispersion develops a short, salve-like texture which is important in imparting palatability and thickening in food systems. However, during the process of cooking native starches, this textural state, particularly with waxy starches, rapidly changes to an elastic, rubbery state in which the swollen granules rupture. Minor variations in cooking time, temperature, and concentration as well as shear and pH are sufficient to effect this transformation. Cross-linking acts to strengthen the granules by reinforcing the hydrogen bonds which are responsible for holding the granules intact and thus are used to overcome the extreme sensitivity of the swollen starch granules to handling and processing conditions.

Aqueous dispersions of cross-linked starch are often used under conditions which involve prolonged storage at relatively low temperature and/or exposure, at times, to repeated freezing and thawing cycles. For example, starch dispersions are used in numerous food products such as canned and frozen foods, particularly fruit preps, pies, soups, and the like. In the case of canned food products, these are often stored in warehouses which have no heating facilities and may therefore be at very low temperatures for prolonged periods and may freeze during shipping. Frozen foods are also subject to long term storage at very low temperatures as well as freezing and thawing during distribution. Under such circumstances involving exposure to low temperature, there is a distinct loss in the hydrating power of the starch which is present in such food products, thereby resulting in syneresis, an extrusion of liquid, together with a marked deterioration in the texture, color and clarity of the food product. While sols of waxy maize starch are superior in stability to those of regular corn starch, even they are prone to intermolecular association during storage at or near freezing temperature.

Attempts to overcome these difficulties are known in the art and include the introduction of blocking groups onto the starch molecule by means of various chemical derivatization reactions, for example, reacting the starch with a monofunctional reagent to introduce substituents such as hydroxypropyl, phosphate, acetate or succinate groups. Such substituents stabilize the starch by interfering with the association between molecules or portions of the same molecule, thus reducing the tendency of the substituted starches to lose their hydration ability, clarity, and short, smooth texture on storage particularly at low temperatures.

These derivatization reactions alone may be carried out on native starches to improve their low temperature stability, but are frequently combined with cross-linking to obtain starches for use as thickeners in canned pie filings, retorted puddings and the like which will keep food from losing its clarity and texture when exposed to low or freezing temperatures.

The use of chemically modified starches, such as cross-linked starches, in food products is regulated by the Food and Drug Administration. These regulations limit the degree of modification by defining the maximum amount of chemical reagent which can be used and the levels of by-products in the resultant starch.

In recent years there has been a trend toward developing starches which have all the properties of a modified starch, but with much lower levels of, or even no, chemical treatment. For example, attempts have been made to increase the low temperature stability of starches by using β-amylase to enzymatically hydrolyze cross-linked waxy starches (Wurzburg, U.S. Pat. No. 3,525,672) and native waxy starches (EP 574 721). Such hydrolysis shortens or removes the outermost β-chains of the starch molecule. Thus, the possibility of association on the part of these branches is lessened, resulting in significant reduction of syneresis and gelling of the food products during exposure to low or freezing temperatures.

The recessive sugary-2 allele of maize was identified in 1934 and its dosing effect on dent corn starch was studied by Campbell, et al. ("Dosage Effect at the Sugary-2 Locus on Maize Starch Structure and Function," Cereal Chemistry 71(5):464–468 (1994)). Campbell discovered that there was a dosing effect for gelatinization onset, gelatinization peak, range total enthalpy, retrogradation, viscosity, and gel strength; that is that there were incremental changes in these properties with the increased presence of the recessive sugary-2 allele.

Work was also done on the starch extracted from a homozygous recessive su$_2$ waxy maize plant. It was discovered that this naturally short β-branched starch has excellent freeze-thaw stability. See Wurzburg, U.S. Pat. No. 4,428,972. However, the plant has a low starch content and milling yield and the starch derived therefrom has fragile granules and a low viscosity.

Surprisingly, it has now been discovered that the waxy maize starch derived from the grain of a plant which is heterozygous for one or two doses of the recessive sugary-2 allele has excellent freeze-thaw stability and a chain-length distribution similar to waxy maize. In addition, the plant starches have a relatively high peak viscosity. Further, the plant has a relatively high starch content and good milling yield.

SUMMARY OF THE INVENTION

The present invention is directed to a waxy maize starch derived from the endosperm grain of a plant which has one or two doses of the recessive sugary-2 allele. Such starch has excellent low temperature and freeze-thaw stability, a chain length distribution similar to that of waxy maize starch, a relatively high peak viscosity, a relatively high pasting temperature, and large, uniformly sound intact granules. The starch is useful in a wide variety of food, pharmaceutical, and industrial applications, either with or without chemical modification. A further advantage is that the plant has a starch content and structure comparable to waxy maize and good milling yield.

An object of the present invention is to provide a waxy maize starch which has excellent low temperature and freeze-thaw stability.

Another object of the present invention is to provide a waxy maize starch which is characterized by having a sol capable of withstanding at least one freeze-thaw cycle more than that of a common waxy maize starch, i.e., one which does not contain at least one recessive sugary-2 allele.

Yet another object of the present invention is to provide a waxy maize starch which has a relatively high peak viscosity.

Still another object of the present invention is to provide a waxy maize starch which is useful as a food thickener.

A further object of the present invention is to provide a starch containing food product which resists syneresis and maintains good texture, color and clarity upon exposure to low or freezing temperatures, including freeze-thaw cycles.

These and other objects of the present invention which will become apparent to one skilled in the art from the following detailed description and examples below may be accomplished by using the starch derived from a waxy maize plant which endosperm is heterozygous for the sugary-2 recessive allele.

DETAILED DESCRIPTION OF THE INVENTION

The present invention is directed to a waxy maize starch derived from a plant which endosperm tissue is heterozygous, either one or two doses, for the recessive sugary-2 allele. Such starch has excellent low temperature and freeze-thaw stability, a chain length distribution similar to that of waxy maize starch, a relatively high peak viscosity, a relatively high pasting temperature, and large, uniformly sound intact granules. A further advantage is that the plant has a starch content and structure comparable to waxy maize and good milling yield. The starch is useful in a wide variety of food, pharmaceutical, and industrial applications, either with or without chemical modification.

The genotype of the plant from which the starch is extracted may be obtained by standard breeding techniques of waxy maize plants, particularly crossbreeding common waxy maize plants with waxy maize plants which are homozygous for the sugary-2 allele. Common waxy maize is grown for many purposes, including for use in the food industry, and is commercially available. Waxy maize which endosperm is homozygous for the sugary-2 allele is described in the literature, including U.S. Pat. Nos. 4,428,972 and 4,615,888 and is commercially available from National Starch and Chemical Company.

The genotype of the plant may also be obtained by translocation, inversion, transformation or any other method of gene or chromosome engineering to include variations thereof whereby the properties of the starch of this invention are obtained. In addition, starch extracted from a plant grown from artificial mutations and variations of the above generic composition which may be produced by known standard methods of mutation breeding is also applicable herein. The designation of the genotype from which the present starches are derived is intended to mean that the genotype will be homozygous for the wx allele and heterozygous for the $su_2$ allele, but is not limited thereto.

Field production of maize plants with endosperms that have one dose of the recessive sugary-2 allele is carried out by crossing female waxy maize plants with the dominant Sugary-2 allele with male waxy maize plants with the recessive sugary-2 allele in homozygous condition. A typical planting arrangement is one male row to seven female rows. The female rows are either detasseled or rendered male sterile through various other means known in the art such as cytoplasmic or genetic means. Field production of maize plants with endosperms that have two doses of the recessive sugary-2 allele is carried out by crossing female waxy maize plants that are homozygous recessive for the sugary-2 allele with male waxy maize plants with the dominant Sugary-2 allele. Planting arrangement and rendering the female plants male sterile would be similar to one dose production.

The substantially pure starch may be extracted from the grain of a waxy maize plant which endosperm is heterozygous, either one or to doses, for the sugary-2 allele. Extraction may be by any method known in the art, including but not limited to dry milling and wet milling, particularly wet milling. Wet milling is a multi-step process involving steeping and grinding of the corn kernels, then separation of the starch, protein, oil, and fiber fractions.

Conversion products derived from the present starches, including fluidity or thin-boiling starches prepared by oxidation, enzyme conversion particularly by α-amylase, acid hydrolysis, heat and or acid dextrinization, thermal and or sheared products are also useful herein.

The present starches may be modified to further enhance their properties and characteristics. Any modifications known in the art may be used, such as derivatizations to form ethers, esters or half esters such as hydroxypropyl ethers, acetates, phosphates, succinates, i.e., octenyl succinate, tertiary and quaternary amine ethers, etc., or by any other modification techniques which produce a starch having the characteristics herein defined.

The modifications include those which are chemical, physical, or thermal. When chemical derivatizations are used, the preferred substituent groups are hydroxypropyl, phosphate or acetate groups.

The preferred chemical modification of the present starch is cross-linking. Any cross-linking agent known in the art may be employed for this purpose, including but not limited to epichlorohydrin, linear dicarboxylic acid anhydrides, citric acid acrolein, phosphorus oxychloride, adipic/acetic mixed acid anhydrides, and trimetaphosphate salts for food systems and to epichlorohydrin, linear dicarboxylic acid anhydrides, citric acid acrolein, phosphorus oxychloride, adipic/acetic mixed acid anhydrides, trimetaphosphate salts, formaldehyde, cyanuric chloride, diioscyanates, and divinyl sulfones in non-food systems. The cross-linking reaction is carried out using techniques known in the art, for example those described in U.S. Pat. Nos. 2,328,537 and 2,801,242. Procedures for modifying starches are described in the Chapter "Starch and Its Modification" by M. W. Rutenberg, pages 22–26 to 22–47, Handbook of Water Soluble Gums and Resins, R. L. Davidson, Editor (McGraw-Hill, Inc., New York, N.Y. 1980).

The amount of cross-linking agent necessary to give a suitable product is well known in the art and will vary depending, inter alia, on the type of cross-linking agent employed, the concentration of the cross-linking agent, the reaction conditions, and the necessity for having a cross-linked starch. Typically, this amount will range from about 0.001 to about 10.0% by weight of the starch.

The present starches may also be physically modified, such as by thermal inhibition described in WO 95/04082 (published Feb. 9, 1995).

The starches may also be pregelatinized. Exemplary processes for preparing pregelatinized starches are disclosed in U.S. Pat. No. 4,280,851 (Pitchon, et al.), U.S. Pat. No. 4,465,702 (Eastman, et al.), U.S. Pat. No. 5,037,929 (Rajagopalan), U.S. Pat. No. 5,131,953 (Kasica, et al.), and U.S. Pat. No. 5,149,799 (Rubens). Conventional procedures for pregelatinizing starch are well known to those skilled in the art and described in such articles as Chapter XXII—"Production and Use of Pregelatinized Starch", Starch: Chemistry and Technology, Vol. III—Industrial Aspects, R. L. Whistler and E. F. Paschall, Editors, Academic Press, New York 1967.

The present starches may be purified by any method known in the art to remove off-flavors and colors that are native to the starch or created during starch modification processes. Purification processes preferred for treating the present starches are disclosed in U.S. Ser. No. 07/832,838 filed Feb. 7, 1992, by Kasica, et al. Alkali washing techniques, for starches intended for use in either granular or pregelatinized form, are also useful and described in the family of patents represented by U.S. Pat. No. 5,187,272 (Bertalan, et al.).

The corn starch of this invention has novel functional properties and molecular characteristics. Valuable properties include excellent low temperature and freeze-thaw stability, a relatively high peak viscosity, a relatively high pasting temperature, and large, uniformly sound intact granules.

The low temperature and freeze-thaw stability of the present starches is significantly better than that of common waxy maize starch. Using the freeze-thaw stability test described in example 1, infra, it was discovered that the present starches remain stable for an average of three to four cycles compared to zero to one for common waxy maize starch. This is important in a variety of food applications in which the food is exposed to prolonged storage at relatively low temperatures, including freezing temperatures, and/or exposure to repeated freezing and thawing cycles. This includes a variety of food products, particularly canned and frozen foods such as pies, soups, and the like. Use of the present starches in such applications will allow the food products to retain their quality by retarding syneresis and marked deterioration of product texture, color and clarity.

The good low temperature and freeze-thaw stability of the present starches is particularly surprising in view of its chain length distribution which is similar to that of waxy maize starch. Previously discovered starches which had such improved stability had short β-branches, such as the enzymatically hydrolyzed starches described by Wurzburg (U.S. Pat. No. 3,525,672) and waxy maize starch which is homozygous for the sugary-2 allele described by Wurzburg (U.S. Pat. No. 4,428,972).

The present starches have a relatively high peak viscosity, comparable though slightly higher than that of common waxy maize starch using the RVA and approaching that of common waxy maize using the Brabender. Further, it is almost twice that of a waxy maize starch which is derived from a plant which endosperm is homozygous for the sugary-2 allele. Viscosity is important in numerous food applications, contributing to the texture and therefore the acceptability of foods. If the viscosity of a starch is low, more starch will generally be necessary to achieve the desired viscosity. However, it is generally preferable to limit the use of starch because it may add undesirable flavors which are difficult to mask, cohesiveness (texture), opacity, and calories. Further, functional starch is often costly.

The overall viscosity profile is similar to that of normal waxy maize starch. This may be due, in part, to the large uniformly sound intact granules. The comparable viscosity profile is important in many food applications as it allows the waxy maize starch to be directly replaced by the present starches without changing the viscosity of the product.

The present starches have a relatively high pasting temperature, almost comparable to that of normal waxy maize starch. The relatively high pasting temperature facilitates extraction from the corn, enhancing the starch yield; yet, it is low enough that the starch will disperse under conventional cooking conditions, i.e., without the use of high pressure and temperature.

The present starches can be used in food products as a direct replacement for chemically modified starch. The starch may be added in an amount effective to provide thickening characteristics to the food which will vary not only with the amount of thickening desired, but also with the amount of water and other ingredients present and the processing conditions used. In general, the present starches are added in an amount of from about 0.1 to about 20% by weight of the food product. The starch may be added either directly to the food product or by adding a slurry or sol containing the starch to the food product.

The thickener composition is prepared by mixing the present starch with water in any suitable proportion depending upon its end-use and the mixture is cooked as desired. If the starch has been modified so as to be cold-water swellable, then cooking is unnecessary. Flour or any ground plant products such as grits, hominy, and meal may be used in place of the starch.

Food product, as used herein, is intended to include any edible product, including, but not limited to: dressings, including pourable dressings and spoonable dressings; pie fillings, including fruit and cream fillings; fruit preps; sauces, including white sauces, tomato sauces, and dairy-based sauces such as cheese sauces; gravies; lite syrups; puddings; custards; yogurts; beverages, including dairy-based beverages; glazes; soups; and baby foods. Further, food product is intended to included those foods which undergo various processing and storage conditions including, but not limited to, retorting, aseptically filled packaging, refrigeration, and freezing.

The present starches may also be used in chemically and/or yeast leavened bakery products as an anti-stalent, providing a resultant product with a softer, moister crumb after baking as well as fresher texture and appearance after a storage period. The present starches, when used as an anti-stalent, are substituted for from about 3 to about 15% of the total farinaceous content of the dough.

The following examples are presented to further illustrate and explain the present invention and should not be taken as limiting in any regard.

EXAMPLES

Example 1—Low Temperature Stability Test

The following analytical test is used to evaluate the low temperature stability of the present starch sols. 100 g distilled water and 4 drops red food coloring are mixed in a beaker. 7.5 g starch at 12% moisture are added and mixed until free of lumps. The beaker is placed in a boiling water bath with the water level above that of the starch mixture. The mixture is heated to 190° F., stirring constantly, then covered and allowed to cook for an additional five minutes. The beaker is then placed in a cold bath, 55° F., until cooled to a temperature of 80° F. The starch mixture is poured into 2 oz. glass bottles to within ½ inch of the neck, removing any bubbles which are present. The samples are then refrigerated or frozen.

a. Low Temperature Stability

The above described samples are refrigerated at 40° F. They are examined weekly for clarity and syneresis. When the sample becomes opaque, or water is present either on the surface or when pressed, the sample is no longer considered stable.

b. Freeze-thaw Stability

The above described samples are frozen for 18 hours at −20° F., thawed for 6 hours at 70° F., and then examined for clarity, texture, and syneresis. This cycle is repeated until the sample is no longer stable. When the sample becomes opaque, loses its gelled quality, or water is present either on the surface or when pressed, the sample is no longer considered stable.

Example 2—Freeze-thaw Stability of Present Starch

The test of Example 1 is used to test the freeze-thaw stability of waxy maize starch derived from plants containing 0, 1, 2, and 3 doses of the recessive sugary-2 allele. The results are shown in Table I below.

TABLE I

Freeze-thaw Stability as a Function of $su_2$ Dosing

| Doses $su_2$ | Genotype | Cycles |
| --- | --- | --- |
| 0 | $SU_2SU_2SU_2$ | 0–1 |
| 1 | $SU_2SU_2su_2$ | 3–4 |
| 2 | $SU_2su_2su_2$ | 2–3 |
| 3 | $su_2su_2su_2$ | 5–6 |

As can be seen from Table I, waxy maize starch containing one or two doses of the recessive sugary-2 allele are significantly more stable to freeze-thaw cycles than that which does not contain a recessive sugary-2 allele. Further, there is no dosing effect for this property in that there is not an incremental change with increased doses of this allele.

Example 3—Enthalpy of Waxy Corn Starch

The enthalpy of cooked, refrigerated starch from waxy starch with 0, 1, 2, and 3 doses of the sugary-2 gene were determined by DSC using the heat profile and solids described in Campbell, et al. "Dosage Effect at the Sugary-2 Locus on Maize Structure and Function," Cereal Chem. 71(5):464–468 (1994).

10 mg starch were weighed into stainless steel pans. Water was added at a ratio of one part starch to two parts water. The samples were then heated from 30° C. to 102° C. at a heating rate of 10° C./min. The samples were stored under refrigeration (5° C.) for seven days and rerun to determine the amount of retrogradation.

The results are shown in Table II below.

TABLE II

Enthalpy as a Function of $su_2$ Dosing with a Starch:Water Ratio of 1:2

| | Gelatinization Data | | | | One Week Retrogradation Data | | | | |
|---|---|---|---|---|---|---|---|---|---|
| Dosing | Onset T (° C.) | Peak T (° C.) | Offset T (° C.) | Delta H (J/g) | Onset T (° C.) | Peak T (° C.) | Offset T (° C.) | Delta H (J/g) | % R |
| 0 | 65.5 | 73.3 | 88.0 | 16.72 | 41.4 | 52.9 | 69.6 | 10.36 | 62.0 |
| 1 | 60.9 | 68.8 | 84.5 | 14.98 | 41.9 | 53.6 | 68.2 | 8.25 | 55.1 |
| 2 | 57.8 | 66.4 | 84.5 | 14.11 | 42.4 | 53.1 | 68.4 | 6.95 | 49.3 |
| 3 | 49.1 | 56.6 | 77.3 | 11.31 | 43.5 | 53.0 | 63.2 | 0.95 | 8.4 |

Example 4—DSC of Present Starches

Waxy maize starches derived from plants containing 0, 1, 2, and 3 doses of the recessive sugary-2 allele were weighed into hermetically sealed steel pans. Water was added at ratios of 1:1 and 1:1.5. Scans were run from 5 to 140° C. at a heating rate of 10° C./minute. Samples were quench-cooled and refrigerated at 5° C. for one week. Scans were run again to determine the retrogradation data. Each data point represents the average of two scans. The results are shown in Table III (starch to water ratio of 1:1) and Table IV (starch to water ratio of 1:1.5).

TABLE III

Enthalpy as a Function of $su_2$ Dosing with a Starch:Water Ratio of 1:1

| | Gelatinization Data | | | | One Week Retrogradation Data | | | |
|---|---|---|---|---|---|---|---|---|
| Dosing | Onset T (° C.) | Peak T (° C.) | Offset T (° C.) | Delta H (J/g) | Onset T (° C.) | Peak T (° C.) | Offset T (° C.) | Delta H (J/g) |
| 0 | 63.7 | 70.3 | 102.2 | 14.84 | 36.4 | 50.3 | 75.3 | 12.67 |
| 1 | 58.7 | 66.0 | 102.9 | 14.17 | 37.6 | 50.4 | 74.2 | 12.43 |
| 2 | 54.0 | 63.0 | 102.0 | 13.97 | 37.1 | 50.4 | 73.5 | 11.64 |
| 3 | 46.5 | 53.7 | 94.6 | 11.74 | 36.6 | 48.9 | 67.9 | 8.50 |

TABLE IV

Enthalpy as a Function of $su_2$ Dosing with a Starch:Water Ratio of 1:1.5

| | Gelatinization Data | | | | One Week Retrogradation Data | | | |
|---|---|---|---|---|---|---|---|---|
| Dosing | Onset T (° C.) | Peak T (° C.) | Offset T (° C.) | Delta H (J/g) | Onset T (° C.) | Peak T (° C.) | Offset T (° C.) | Delta H (J/g) |
| 0 | 64.1 | 71.5 | 91.4 | 16.57 | 37.7 | 50.5 | 71.5 | 11.21 |
| 1 | 59.6 | 67.1 | 89.4 | 16.35 | 41.1 | 50.9 | 68.5 | 5.58 |
| 2 | 55.6 | 64.0 | 90.5 | 14.87 | 38.8 | 49.5 | 68.3 | 6.92 |
| 3 | 47.3 | 69.1 | 68.6 | 12.30 | 43.4 | 51.0 | 62.9 | 1.19 |

As can be seen from Tables III and IV, there is not a true sugary-2 dosing effect for gelatinization onset or gelatinization peak of waxy maize after one week of retrogradation.

Example 5—Viscosity of Present Starch Using a Brabender Viscoamylograph

The peak viscosity of waxy maize starch derived from plants containing 0, 1, 2, and 3 doses of the recessive sugary-2 allele was determined using a Brabender viscoamylograph. 27.0 g anhydrous starch are mixed with 500.0 g distilled water and added to the Brabender viscoamylograph bowl. The slurry is heated from 50° C. to 95° C. at a rate of 1.5° C./minute and held at 95° C. for twenty minutes. The slurry is then cooled to 50° C. at a rate of 1.5° C./minute. The results are shown in Table V below.

TABLE V

Peak Viscosity as a Function of $su_2$ Dosing

| Doses $su_2$ | Genotype | Peak Viscosity (BU) |
|---|---|---|
| 0 | $SU_2SU_2SU_2$ | 800 |
| 1 | $SU_2SU_2su_2$ | 670 |

TABLE V-continued

Peak Viscosity as a Function of $su_2$ Dosing

| Doses $su_2$ | Genotype | Peak Viscosity (BU) |
|---|---|---|
| 2 | $SU_2su_2su_2$ | 685 |
| 3 | $su_2su_2su_2$ | 450 |

As can be seen from Table V, waxy maize starch containing one or two doses of the recessive sugary-2 allele have a significantly higher peak viscosity than that which does not contain a recessive sugary-2 allele. Further, unlike Campbell, et al. found in a dent background, there is no dosing effect for this property in the waxy background.

Figure 1:
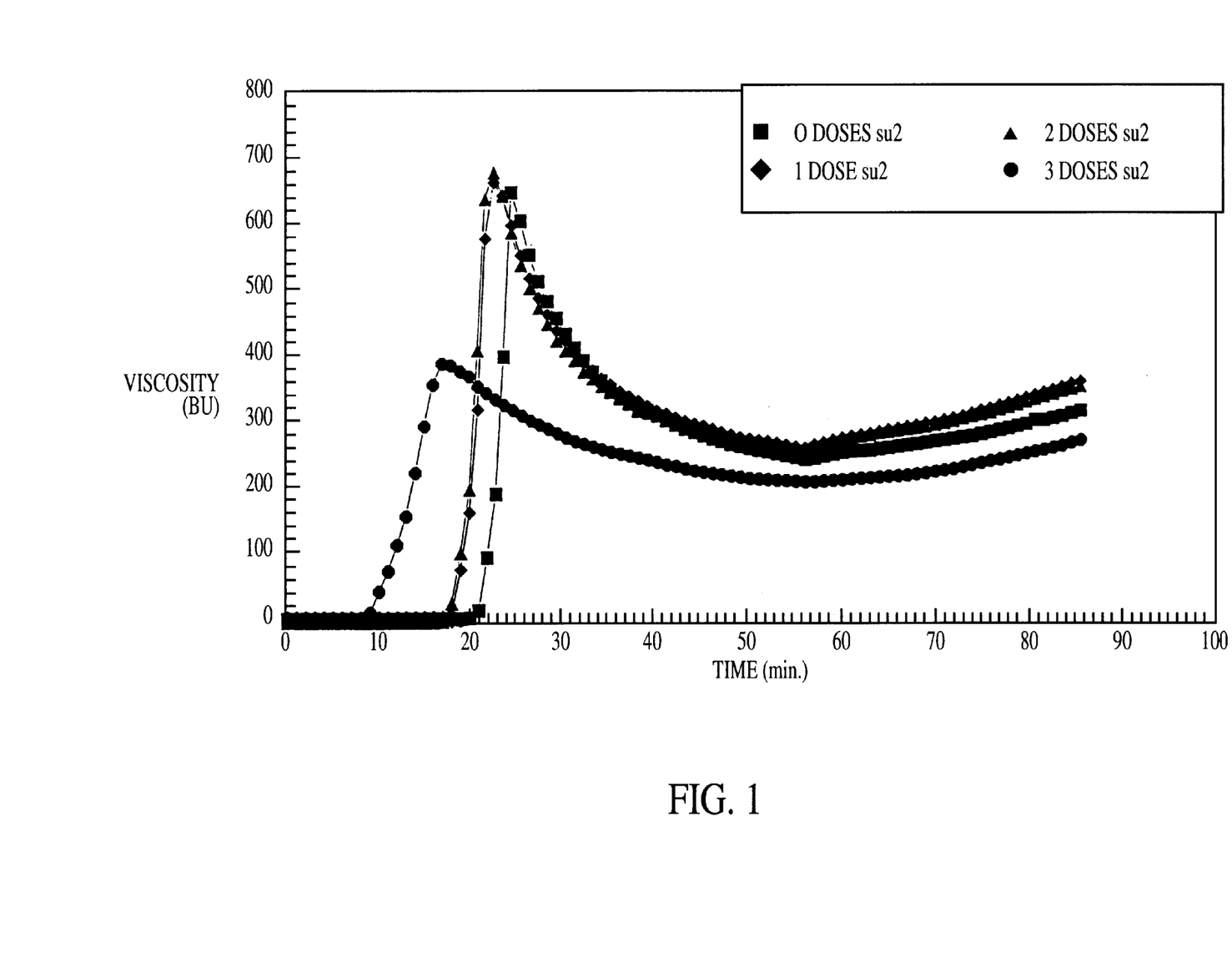
FIG. 1 depicts how the viscosity of waxy maize starch varies with doses of the recessive sugary-2 allele as measured with a Brabender Viscoamylograph.

The viscosity profiles of obtained using the above Brabender Viscoamylograph are shown in FIG. 1.

As can be seen from FIG. 1, waxy maize starch containing one or two doses of the recessive sugary-2 allele have viscosity profiles similar to waxy maize starch without the recessive sugary-2 allele and higher than that of waxy maize which is homozygous for the recessive sugary-2 allele. Further, there is no dosing effect for this property in that there is not an incremental change with increased doses of this allele.

Example 6—Viscosity of Present Starch Using a Rapid Visco Amylograph

The viscosity of waxy maize starch derived from plants containing 0, 1, 2, and 3 doses of the recessive sugary-2 allele was determined using an RVA Series 4 Rapid Visco Amylograph (Newport Scientific, Eden Prairie, Minn.). A slurry containing 5.5% starch on a dry weight basis is prepared and heated from 50° C. to 95° C. at a rate of 4.5° C. per minute. The slurry is then held at 95° C. for five minutes. The slurry is then cooled to 50° C. at a rate of 5° C./minute. The results are shown in Table VI below.

TABLE VI

Viscosity as a Function of $su_2$ Dosing

| Doses $su_2$ | Genotype | Paste Onset (° C.) | Peak Temp. (° C.) | Peak Viscosity (cP) |
|---|---|---|---|---|
| 0 | $SU_2SU_2SU_2$ | 71 | 79 | 1290 |
| 1 | $SU_2SU_2su_2$ | 69 | 78 | 1340 |
| 2 | $SU_2su_2su_2$ | 65 | 76 | 1370 |
| 3 | $su_2su_2su_2$ | 57 | 73 | 710 |

| Doses $su_2$ | Genotype | Viscosity at 95° C. (cP) | Viscosity at 95° C. + 5 min. (cP) | Viscosity at 50° C. (cP) | Setback |
|---|---|---|---|---|---|
| 0 | $SU_2SU_2SU_2$ | 840 | 600 | 670 | 70 |
| 1 | $SU_2SU_2su_2$ | 850 | 550 | 630 | 80 |
| 2 | $SU_2su_2su_2$ | 1030 | 730 | 840 | 110 |
| 3 | $su_2su_2su_2$ | 580 | 500 | 560 | 60 |

As can be seen from Table VI, waxy maize starch containing one or two doses of the recessive sugary-2 allele have a slightly higher peak viscosity than that which does not contain a recessive sugary-2 allele, yet a comparable peak temperature. Further, there is no dosing effect for this property in that there is not an incremental change with increased doses of this allele.

Also, as can be seen from Table VI, the pasting onset temperature and the peak temperature decrease with increasing doses of the recessive sugary-2 allele which differs from that reported in Campbell, et al. ("Dosage Effect at the Sugary-2 Locus on Maize Starch Structure and Function," Cereal Chemistry 71(5):464–468 (1994)) for a dent background.

Figure 2:
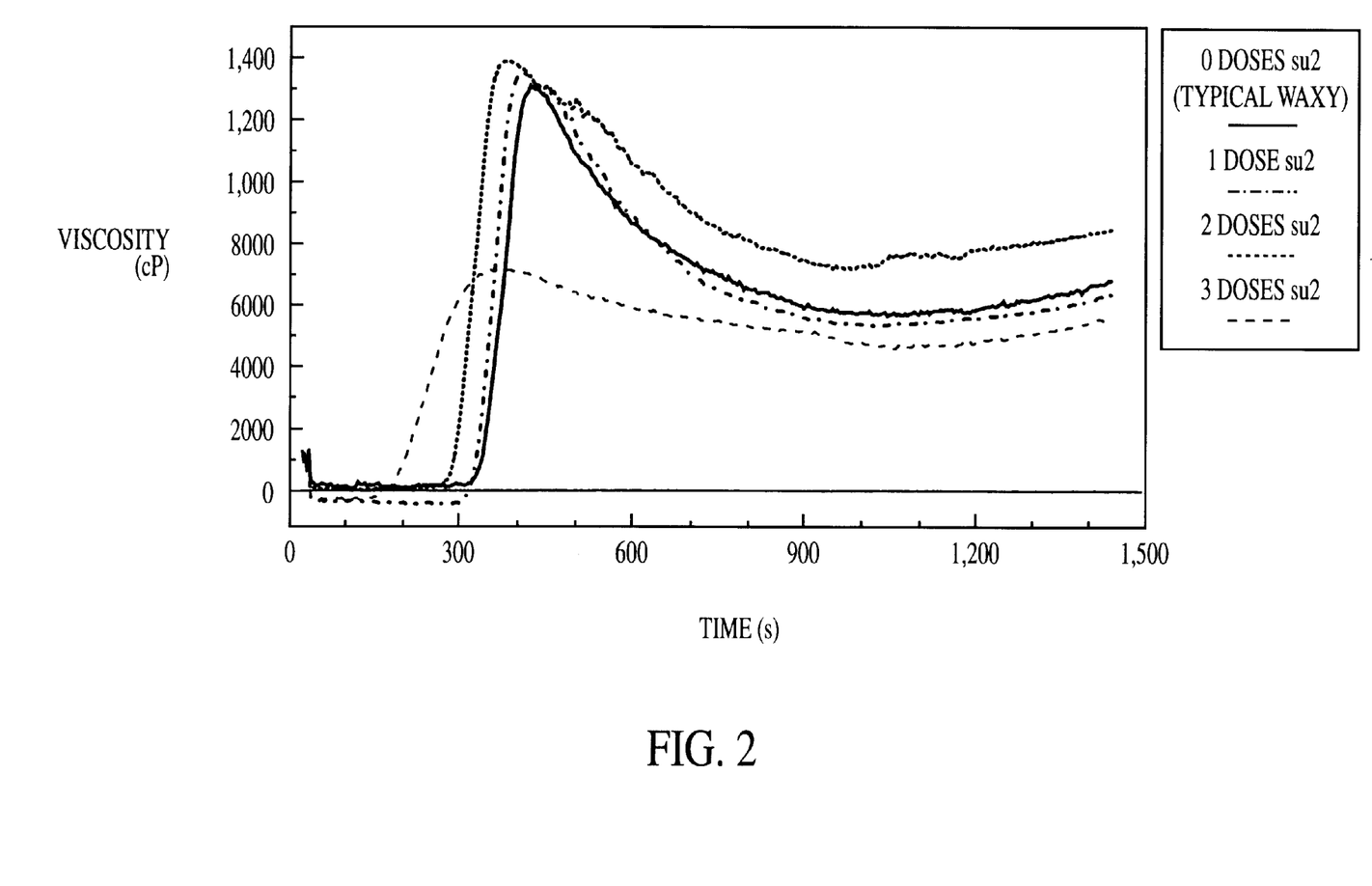
FIG. 2 depicts how the viscosity of waxy maize starch varies with doses of the recessive sugary-2 allele as measured with a Rapid Visco Amylograph.

The viscosity profiles obtained using the above Rapid Visco Amylograph are shown in FIG. 2 below.

As can be seen from FIG. 2, waxy maize starch containing one or two doses of the recessive sugary-2 allele have a viscosity profiles similar to waxy maize starch without the recessive sugary-2 allele and higher than that of waxy maize which is homozygous for the recessive sugary-2 allele. Further, there is no dosing effect for this property in that there is not an incremental change with increased doses of this allele.

Example 7—Chain-Length Distribution (HPAEC)

Chain-length distribution was determined by high performance anion exchange chromatography (HPAEC) with pulsed amperometric detection (Dionex Corp., Sunnyvale, Calif.). A Dionex Carbopac PA-100 column (4×250 mm) was used with a Carbopac PA Guard column (3×25 mm). The potential and time settings on PAD cell were $E_1$=0.10 ($+_1$=480); $E_2$=0.60 ($+_2$=120); $E_3$=0.80 V ($t_3$=300 ms).

The eluent A was 150 mM sodium hydroxide solution, which was prepared by dilution of carbonate-free 50% sodium hydroxide in deionized water. The eluent B was 150 mM sodium hydroxide solution, containing 500 mM sodium acetate. The gradient program used is shown in the table (Pump Gradient for Dionex) starting with 85% eluent A and 15% eluent B, ending with 100% eluent B. All separations were carried out at ambient temperatures with a flow rate of 1 ml/minute.

Note: This measurement is made for all chains having a DP of up to 60, i.e., the percentage area DP shown will be the percent based on the total area of all chains up to 60. Also, 6 DP is the shortest chain that is seen.

Pump Gradient for Dionex

| Time | % A | % B |
|---|---|---|
| 0.0 | 85 | 15 |
| 0.1 | 85 | 15 |
| 0.4 | 85 | 15 |
| 20.0 | 65 | 35 |
| 35.0 | 50 | 50 |
| 50.0 | 40 | 60 |
| 75.0 | 30 | 70 |
| 85.0 | 25 | 75 |
| 87.0 | 0 | 101 |
| 95.0 | 85 | 5 |
| 105.0 | 85 | 15 |

To prepare the samples, each starch sample (20 mg) was weighed into a 10 ml vial; 2 ml of 90% DMSO (dimethyl sulfoxide) (DMSO:water=9:1, volume/volume) was added, mixed with a magnetic string bar, and heated in a boiling water bath for 5 minutes. Then, 7 ml of water was added and mixed. After the mixture was cooled to room temperature, 1 ml of 150 mM sodium hydroxide was added, mixed and 1 ml of solution was run by the Dionex.

Figure 3:
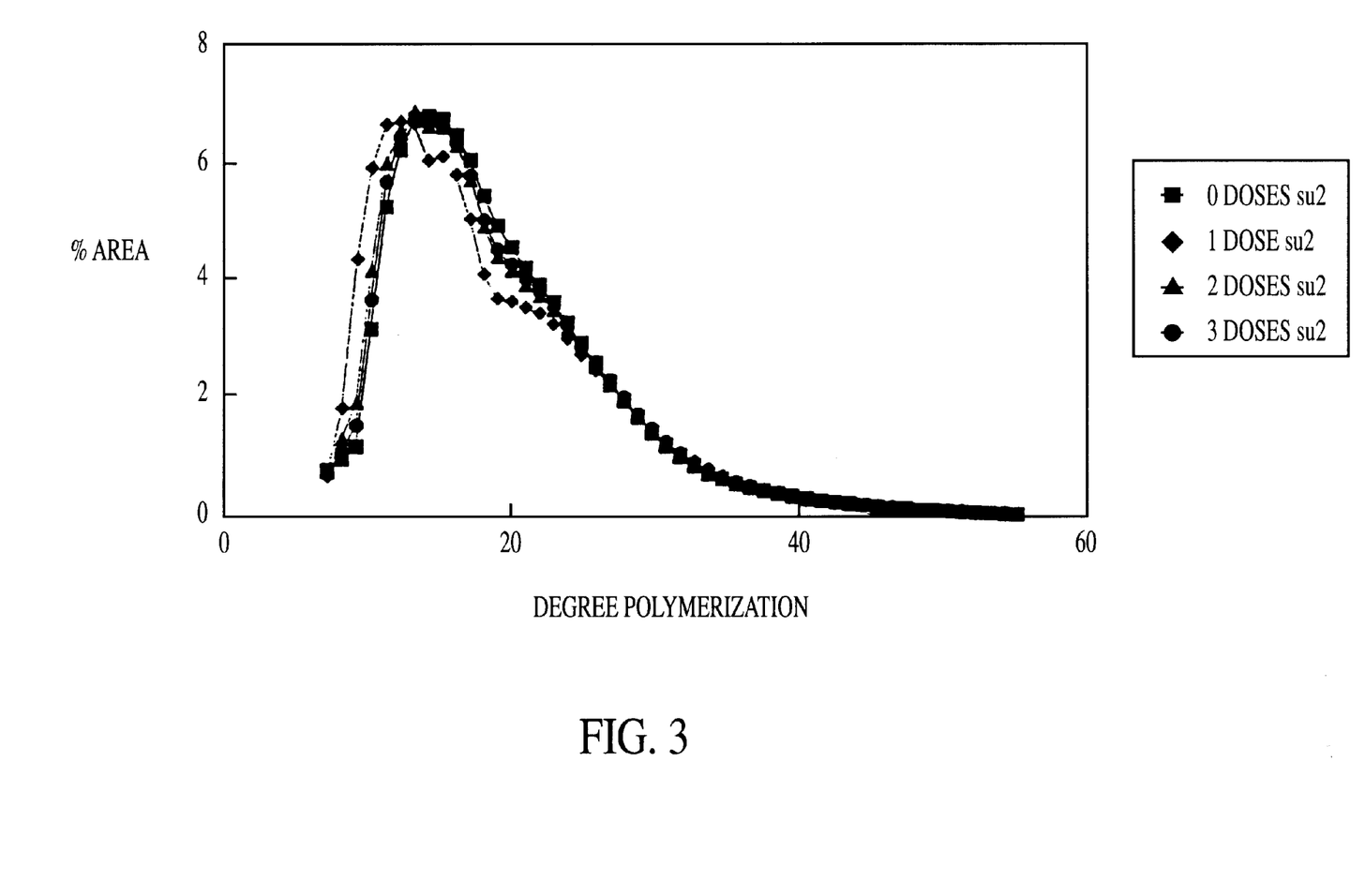
FIG. 3 depicts how the chain length distribution of waxy maize starch varies with doses of the recessive sugary-2 allele as measured by high performance anion exchange chromatography.

The results are shown in FIG. 3.

As can be seen from FIG. 3, the waxy maize starch containing one or two doses of the recessive sugary-2 allele has a profile closer to that of waxy maize without the recessive sugary-2 allele than that of waxy maize which is homozygous for the recessive sugary-2 allele. Thus, the waxy maize starch containing one or two doses of the recessive sugary-2 allele has β-chains which are closer in length to those of waxy maize without the recessive sugary-2 allele than those of waxy maize which is homozygous for the recessive sugary-2 allele.

Example 8—Particle Size

The average particle size of waxy maize starch derived from plants containing 0, 1, 2, and 3 doses of the recessive sugary-2 allele was measured in deionized water by laser-light scattering using a Horiba Model LA-900. The Horiba settings were:

Agitation Speed=4
Circulation Speed=3
Ultrasonic Time=1 minute
Waiting Time After Ultrasonic=0 seconds
Sampling Times=20
Relative Refractive Index=1.18

The results can be seen in Table VII below.

TABLE VII

Average Particle Size

| Doses $su_2$ | Genotype | Particle Size ($\mu$m) |
|---|---|---|
| 0 | $SU_2SU_2SU_2$ | 14.22 |
| 1 | $SU_2SU_2su_2$ | 14.84 ± 0.21 |
| 2 | $SU_2su_2su_2$ | 14.23 ± 0.57 |
| 3 | $su_2su_2su_2$ | 11.81 |

As can be seen from table VII, the waxy maize starch containing one or two doses of the recessive sugary-2 allele has an average particle size closer to that of waxy maize without the recessive sugary-2 allele than that of waxy maize which is homozygous for the recessive sugary-2 allele.

Example 9—Production of a Cross-linked Starch a) A starch slurry is prepared which contained 1000 g of the starch derived from the endosperm of a waxy maize plant which is heterozygous, one dose, for the sugary-2 allele and 1500 g water. To this slurry is added 250 g sodium sulfate. The pH is then adjusted to 11–12 by addition of 500 g of a 3% sodium hydroxide solution. The slurry is brought to a temperature of 30° C.

Next, 0.2 g phosphorous oxychloride is added to cross-link the starch. The reaction is allowed to proceed for 30 minutes. The pH is then adjusted to 3.0 with sulfuric acid and held for one hour.

The slurry is then neutralized to a pH of 5–7 using a 3% solution of sodium hydroxide, washed with distilled water, and dried using conventional means known in the art.

b) Example 9a is repeated using the starch derived from the endosperm of a waxy maize plant which is heterozygous, two doses, for the sugary-2 allele.

Example 10—Preparation of a White Sauce

This example illustrates that use of the present starches in a white sauce.

a) The following formulation and procedure were employed:

White Sauce Formulation

| Ingredients | Percent (% by wt.) |
|---|---|
| Light Cream | 20.0 |
| Salt | 0.5 |

-continued

White Sauce Formulation

| Ingredients | Percent (% by wt.) |
|---|---|
| Nonfat Dry Milk | 7.0 |
| Starch of Example 9a | 3.35 |
| Water | 69.15 |

Blend together cream, salt, milk and half the water. Heat to 90° C. In a separate container, mix together the starch and the remaining water to form a starch slurry. Add to cream mixture. Hold mixture at 90° C. for ten minutes. Cool to 40° C.

b) Example 10a was repeated using the starch of Example 9b.

Example 11—Preparation of a Pudding

This example illustrates that use of the present starches in a pudding.

a) The following formulation and procedure were employed:

Pudding Formulation

| Ingredients | Percent (% by wt.) |
|---|---|
| Disodium phosphate | 0.76 |
| Nonfat Dry Milk | 7.27 |
| Light Cream | 16.17 |
| Starch of Example 9a | 5.42 |
| Water | 70.38 |

Blend together all ingredients. Heat to 90° C. and hold 10 minutes. Cool to 50° C., then refrigerate.

b) Example 11a is repeated using the starch of Example 9b.

Example 12—Preparation of a Fruit Pie Filling

This example illustrates that use of waxy potato starch in a fruit pie filling. a)

The following formulation and procedure were employed:

Fruit Pie Filling Formulation

| Ingredients | Percent (% by wt.) |
|---|---|
| Sugar | 17.73 |
| Lemon Juice | 0.96 |
| Salt | 0.19 |
| Cherry Juice | 61.46 |
| Starch of Example 9a | 4.81 |
| Water | 14.85 |

Blend together all ingredients. Heat to 90° C. and hold for five minutes. Cool to 40° C.

b) Example 12a is repeated using the starch of Example 9b.

Example 13—Use of the Present Starch as an Anti-stalent

The following bread formulation and procedure were used to prepare bread which had anti-stalent properties.

| Ingredient | Amount (g) |
| --- | --- |
| All Purpose Wheat Flour | 345 |
| Present Starch | 35 |
| Water | 230 |
| Sugar | 18.85 |
| Shortening (plastic consistency) | 10.0 |
| Salt | 9.35 |
| Active Dry Yeast | 7 |

The yeast was dissolved in warm water (approximately 115° F.) and allowed to stand for one minute. Thereafter, the shortening and the remaining pre-blended ingredients were added to the yeast mixture. The mixture was mixed for two minutes on speed #1 of a Hobart Mixer and then for an additional two minutes on speed #2. The dough was then kneaded for four minutes and placed in a greased bowl, covered with a damp cloth, and allowed to rise in a controlled humidity cabinet (80% humidity and 85° F.) for 1.25 hours. The dough was then punched down, divided in half, and placed in two small aluminum pans. The dough was allowed to rise for an additional hour under the same conditions as before. The loaves were then baked for 20 minutes at 425° F.

We claim:

1. A starch extracted from the endosperm of a waxy maize plant which is heterozygous for the sugary-2 allele.

2. The starch of claim 1 which is chemically or physically modified.

3. The starch of claim 1 which is derivatized to contain substituent groups.

4. The starch of claim 1 which is derivatized to contain substituent groups and cross-linked.

5. A process of making a sol with a starch of claim 1 comprising forming a slurry with water and a sol-making effective amount of starch and cooking the slurry under conditions effective to produce the sol, wherein the sol is capable of withstanding at least one freeze-thaw cycle more than a sol prepared with waxy maize starch which endosperm does not contain the recessive sugary-2 allele.

6. The process of claim 5, said starch being derivatized to contain substituent groups.

7. The process of claim 5, said starch being derivatized to contain substituent groups and cross-linked.

* * * * *